United States Patent
Ryuutou et al.

[11] Patent Number: 6,085,230
[45] Date of Patent: Jul. 4, 2000

[54] SERVER AND RECORDING MEDIUM

[75] Inventors: Takeshi Ryuutou; Yoshitaka Kizuka, both of Kawasaki, Japan

[73] Assignee: Fujitsu Limited, Kawasaki, Japan

[21] Appl. No.: 09/436,138

[22] Filed: Nov. 9, 1999

[30] Foreign Application Priority Data

Mar. 31, 1999 [JP] Japan ................................. 11-090670

[51] Int. Cl.[7] .................................................. G06F 13/00
[52] U.S. Cl. .......................................................... 709/203
[58] Field of Search ................................... 709/200, 201, 709/203, 217, 218, 219

[56] References Cited

U.S. PATENT DOCUMENTS

| | | | |
|---|---|---|---|
| 5,838,682 | 11/1998 | Dekelbaum et al. | 370/351 |
| 5,917,817 | 6/1999 | Dunn et al. | 370/352 |
| 5,944,795 | 8/1999 | Civanlar | 709/227 |
| 5,968,119 | 10/1999 | Stedman et al. | 709/219 |
| 5,974,135 | 10/1999 | Breneman et al. | 379/265 |
| 6,003,085 | 12/1999 | Ratner et al. | 709/227 |
| 6,006,251 | 12/1999 | Toyouchi et al. | 709/203 |

FOREIGN PATENT DOCUMENTS 10111892 4/1998 Japan.

*Primary Examiner*—Moustafa M. Meky
*Attorney, Agent, or Firm*—Greer, Burns & Crain, Ltd.

[57] ABSTRACT

A server capable of uninterrupted operation. When access from a client has occurred, session specification information generating means generates a session ID specifying the session of this client, and supplies the generated session ID to definition information supply means and association information generating means. The association information generating means looks up the date and time generated by a timer to specify applicable definition information, and also generates association information that associates the definition information with the session ID, the association information being stored in association information storing means. Definition information specifying means acquires the session ID supplied from the session specification information generating means in the case of the first access in a session, or the session ID supplied from the client in the case of subsequent access, looks up the association information stored in the association information storing means to acquire the corresponding definition information from a definition information storage section, and transmits the acquired definition information via the definition information supply means to the client that has made the request.

5 Claims, 16 Drawing Sheets

| VALIDITY TERM | DEFINITION EDITION NO. |
|---|---|
| 3/10 00:00 – 3/20 23:59 | 01 |
| 3/21 00:00 – 4/20 24:00 | 02 |
| ⋮ | ⋮ |

FIG. 3

| SESSION ID | DEFINITION EDITION NO. |
|---|---|
| 10 | 01 |
| 11 | 01 |
| 12 | 02 |
| ⋮ | ⋮ |

SERVER AND RECORDING MEDIUM

BACKGROUND OF THE INVENTION (1) Field of the Invention

The present invention relates to a server and a recording medium, and more particularly, to a server capable of accepting a session, which is a series of requests issued from a client, and to a computer-readable recording medium for causing a computer to function as such a server.

(2) Description of the Related Art

With the spread of the Internet to ordinary homes, various services have become available through the Internet. Such services include, for example, reservation of hotel rooms or concert tickets, and purchase of goods by mail order.

In providing such services, it is often necessary that the contents of data such as images to be supplied to the client side should be modified. When data is to be modified, access must be temporarily restrained, and after all ongoing accesses are terminated, the required data is modified, in order to prevent erroneous data from being transmitted to the then accessing clients.

Thus, after the server is stopped with access thereto restrained, data requiring modification must be modified, and accordingly, a problem arises in that there is a period of suspension during which the services are unavailable.

The advantage of providing services through a server is that the services are available at any time, but in the case of a server in which data is frequently modified, the advantage lessens considerably.

SUMMARY OF THE INVENTION

An object of the present invention is to provide a server capable of uninterrupted operation. To achieve the object, there is provided a server capable of accepting a session which is a series of requests issued from a client. The server comprises session specification information generating means, responsive to initiation of a session of the client, for generating session specification information which is information specifying the session, association information generating means for generating association information indicative of association of the session specification information with corresponding definition information, association information storing means for storing the association information, definition information specifying means, responsive to access from the client, for looking up the association information to specify the definition information corresponding to the session specification information which the client possesses, and definition information supply means for supplying the definition information specified by the definition information specifying means or information related to the definition information to the client that has made the access.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a diagram showing an example of a validity term management table stored in association information storing means appearing in FIG. 1;

FIG. 4 is a diagram showing an example of a session management table stored in the association information storing means appearing in FIG. 1;

DESCRIPTION OF THE PREFERRED EMBODIMENTS

Figure 1:
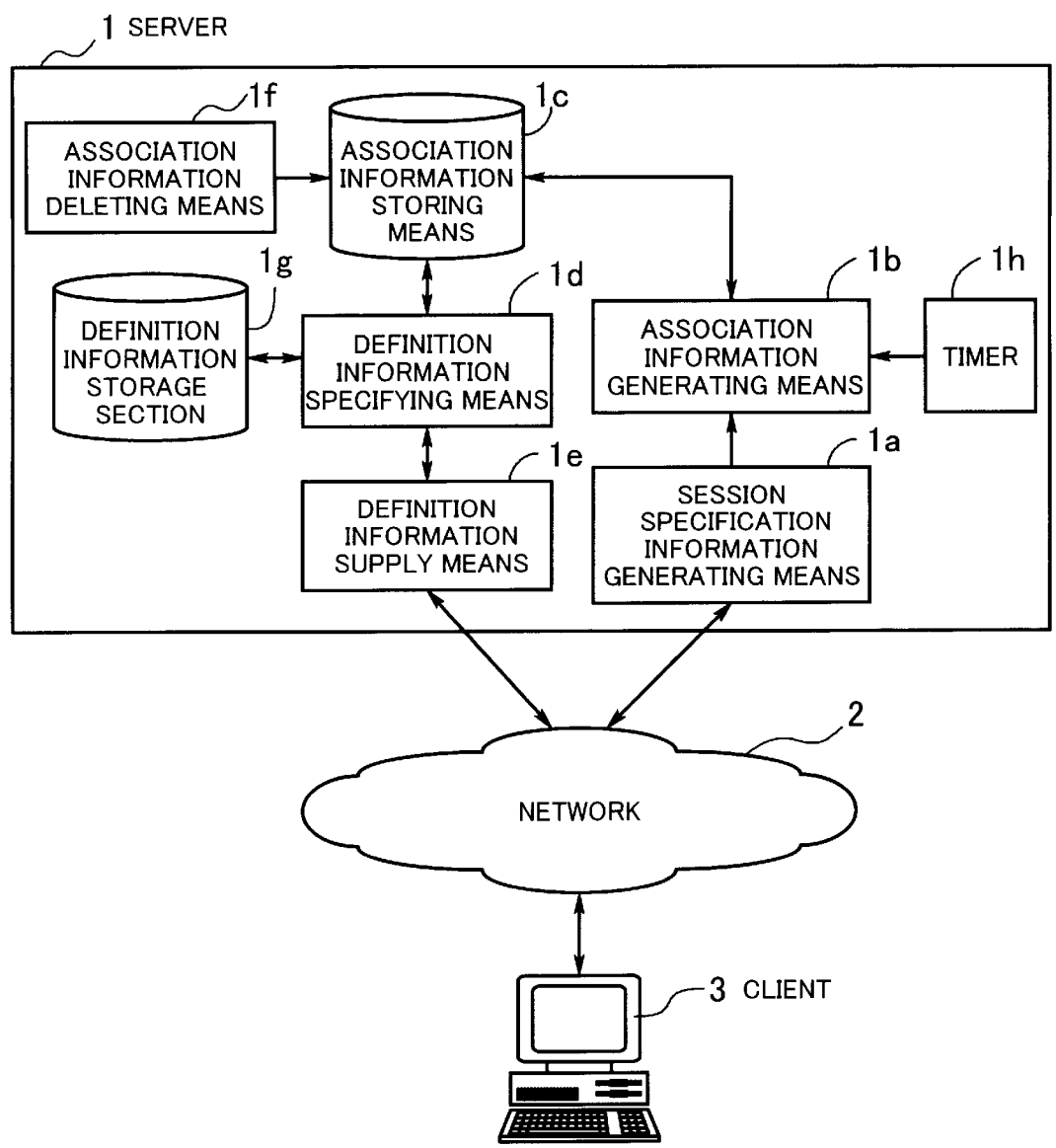
FIG. 1 is a block diagram showing an example of configuration according to one embodiment of the present invention.

An embodiment of the present invention will be hereinafter described with reference to the drawings. FIG. 1 shows an example of configuration according to the embodiment of the present invention. In the figure, a server 1 reads out data as requested by a client 3 and supplies same to the client.

A network 2, which is the Internet or the like, transmits packets of information between the client 3 and the server 1.

The client 3 comprises a personal computer or the like and exchanges information with the server 1 through a Web browser, which is an application program.

The server 1 comprises session specification information generating means 1a, association information generating means 1b, association information storing means 1c, definition information specifying means 1d, definition information supply means 1e, association information deleting means 1f, a definition information storage section 1g, and a timer 1h.

When the client 3 has initiated a session, the session specification information generating means 1a generates a session ID as session specification information which is information specifying this session.

Figure 2:
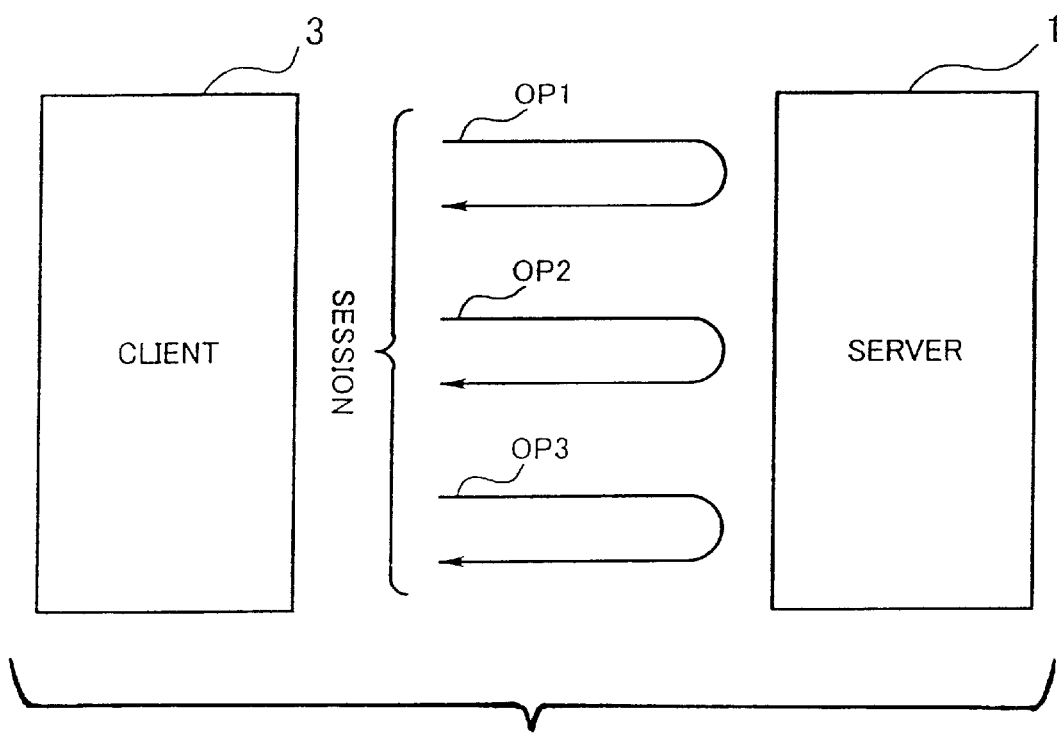
FIG. 2 is a diagram illustrating an outline of session.

As shown in FIG. 2, session is a process (OP1–OP3) which is executed in response to a series of requests (e.g., retrieval in database search) from the same client 3 and which can be processed as a single transaction. In the example of FIG. 2 is shown a series of operations OP1 to OP3 performed at the request of the client 3.

The association information generating means 1b generates association information which indicates the association of the session specification information with its corresponding definition information.

The association information storing means 1c stores the association information generated by the association information generating means 1b in a session management table, described later.

When access from the client has occurred again, the definition information specifying means 1d looks up the association information and specifies the definition information corresponding to the session ID that the client possesses.

The definition information includes data (e.g., HTML document) to be supplied to the client, information indicative of the storage locations of programs and files for transmitting data to the client, etc.

The definition information supply means 1e supplies the definition information specified by the definition information specifying means 1d or information related to the definition information to the client that has made the access.

When the session of a predetermined client has ended, the association information deleting means 1f deletes the corresponding association information from the association information storing means 1c.

The definition information storage section 1g stores the aforementioned definition information.

The timer 1h generates date-time information and supplies same to the association information generating means 1b.

The operation of the above embodiment will be now described. The following description is given on the assumption that the server 1 provides hotel reservation service, by way of example.

Let it be assumed that the Web browser is started at the client 3 and the client accesses the server 1 through the network 2, whereupon the definition information supply means 1e of the server 1 refers to the information transmitted from the client 3 and determines whether or not it includes a session ID which is information specifying session. If no session ID is included, the definition information supply means 1e recognizes that a new session has been started. As such session specifying information, URL (Uniform Resource Locator) or a unique HTTP (Hyper Text Transfer Protocol) header may be used.

If, as a result of the determination, it is judged that a new session has been started, the session specification information generating means 1a generates a session ID uniquely specifying this session. In this case, "10", for example, is generated as the session ID. The session ID thus generated is supplied to the association information generating means 1b.

The association information generating means 1b refers to the date-time information supplied from the timer 1h to obtain the current date and time, and acquires an edition number (information specifying the definition information) of the definition information corresponding to the current date and time from a validity term management table (cf. FIG. 3) stored in the association information storing means 1c.

In the validity term management table shown in FIG. 3 are described validity terms of definition information with respective edition numbers. For example, the definition information indicated by the definition edition number "01" has a term of validity of "3/10 00:00–3/20 23:59". Also, the definition information indicated by the definition edition number "02" has a validity term of "3/21 00:00–4/20 24:00".

If, for example, the current date and time are "3/20 23:59", then the association information generating means 1b recognizes by referring to the table shown in FIG. 3 that the edition number of the definition information to be supplied to the client 3 is "01". As a method of specifying definition information by edition number, the latest definition information at the time of initiation of a session may be regarded as the applicable definition information.

Subsequently, the association information generating means 1b generates association information indicative of the association of the session with the definition edition number, and stores same in the association information storing means 1c as a session management table shown in FIG. 4. In the example shown in FIG. 4, the session ID "10" and the session ID "11" are associated with the definition information with the edition number "01", and the session ID "12" is associated with the definition information with the edition number "02". Since, in this example, the session ID "10" is associated with the definition edition number "01", the items in the first row of the table are the items created by the process described above. The association information is created when a new session is initiated, and is deleted by the association information deleting means 1f when the session is terminated.

The definition information supply means 1e then acquires the session ID newly generated by the session specification information generating means 1a, and instructs the definition information specifying means 1d to specify definition information corresponding to the session ID. Since, in this example, "10" has been set as the session ID, the definition information specifying means 1d specifies the corresponding definition edition number, that is, "01", by referring to the session management table (cf. FIG. 4) newly stored in the association information storing means 1c.

Figure 5:
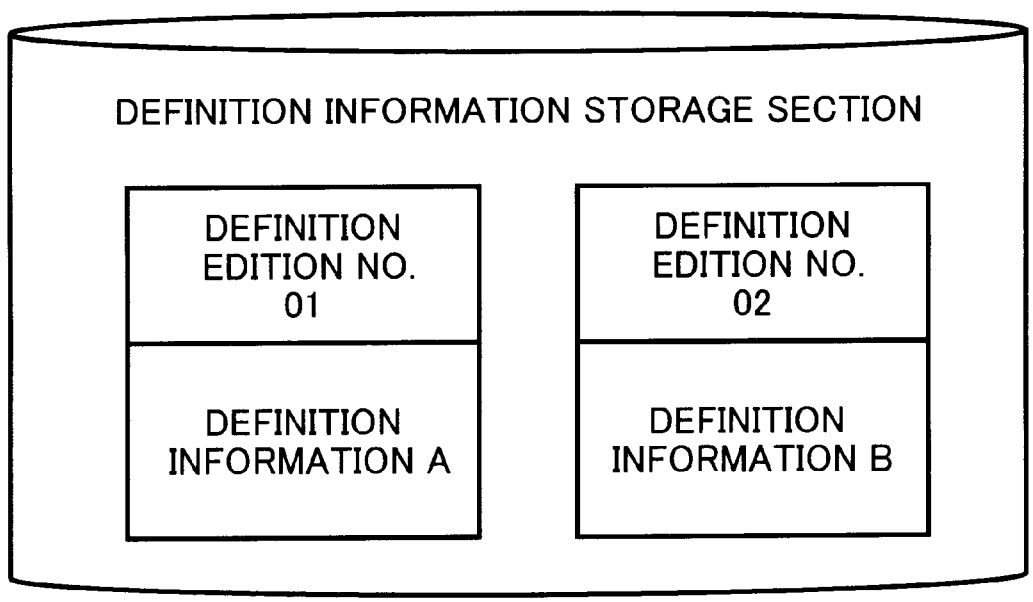
FIG. 5 is a diagram showing an example of definition information stored in a definition information storage section appearing in FIG. 1.

Subsequently, the definition information specifying means 1d acquires, from the definition information storage section 1g, predetermined data included in the definition information corresponding to the specified definition edition number. FIG. 5 shows an example of definition information stored in the definition information storage section 1g. In the example shown in FIG. 5, definition information A with the edition number "01" and definition information B with the edition number "02" are stored.

Since, in this example, the acquired definition edition number is "01", the definition information A is the subject of acquisition. Accordingly, the definition information specifying means 1d acquires predetermined data (e.g., HTML document etc.) included in the definition information A from the definition information storage section 1g, and supplies the acquired data to the definition information supply means 1e.

The definition information supply means 1e appends the session ID to the definition information acquired by the definition information specifying means 1d, puts the information into packets according to HTTP, and transmits the packets to the client 3. The session ID may be appended, for example, to a location header, a Cookie header, or a unique HTTP header.

Consequently, the client 3 acquires the session ID from the location header of the received information and stores same (e.g., as Cookie); also it allows the definition information to be shown in a browser at its display device.

Figure 6:
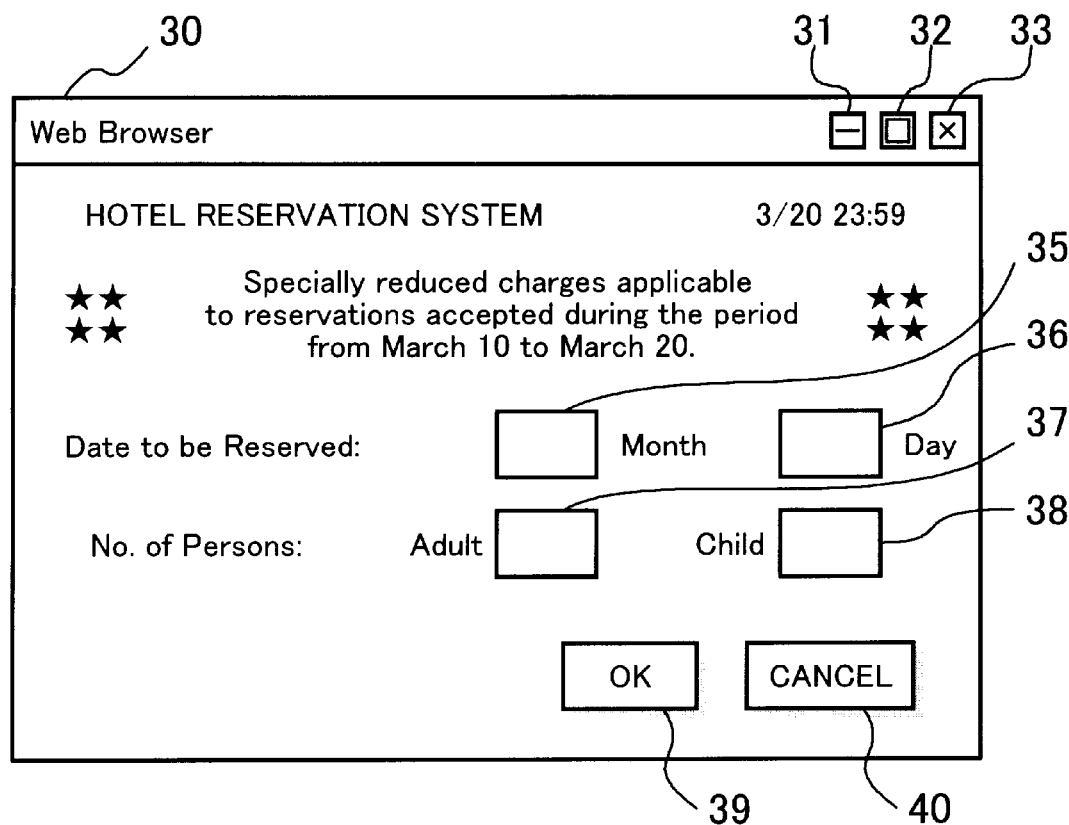
FIG. 6 is a diagram showing an example of a screen which is displayed first when a client accesses a server in the embodiment shown in FIG. 1.

As a result, the display device displays a screen (screen based on the definition information transmitted from the server 1) as shown in FIG. 6. In the illustrated example, a window 30 entitled "Web Browser" is displayed. In the upper right corner of the window 30, there are shown buttons 31 to 33 which are operated to minimize, maximize and close the window 30, respectively.

Also, a title "HOTEL RESERVATION SYSTEM" is shown at the top of the display area of the window 30. To the right of the title is shown "3/20 23:59" which indicates the date and time of access. Beneath the title and the date and time, a message announcing that specially reduced charges will be applied to reservations accepted during the period from March 10 to March 20 is displayed.

Beneath the message, there are shown "Date to be Reserved" and "No. of Persons", which indicate data entry items, as well as text boxes 35 to 38 in which the necessary information is to be entered. Also, at the bottom of the display area, an "OK" button 39, which is operated when a reservation is to be made in accordance with the contents of input information, and a "CANCEL" button 40, which is operated to cancel the input information, are displayed.

Figure 7:
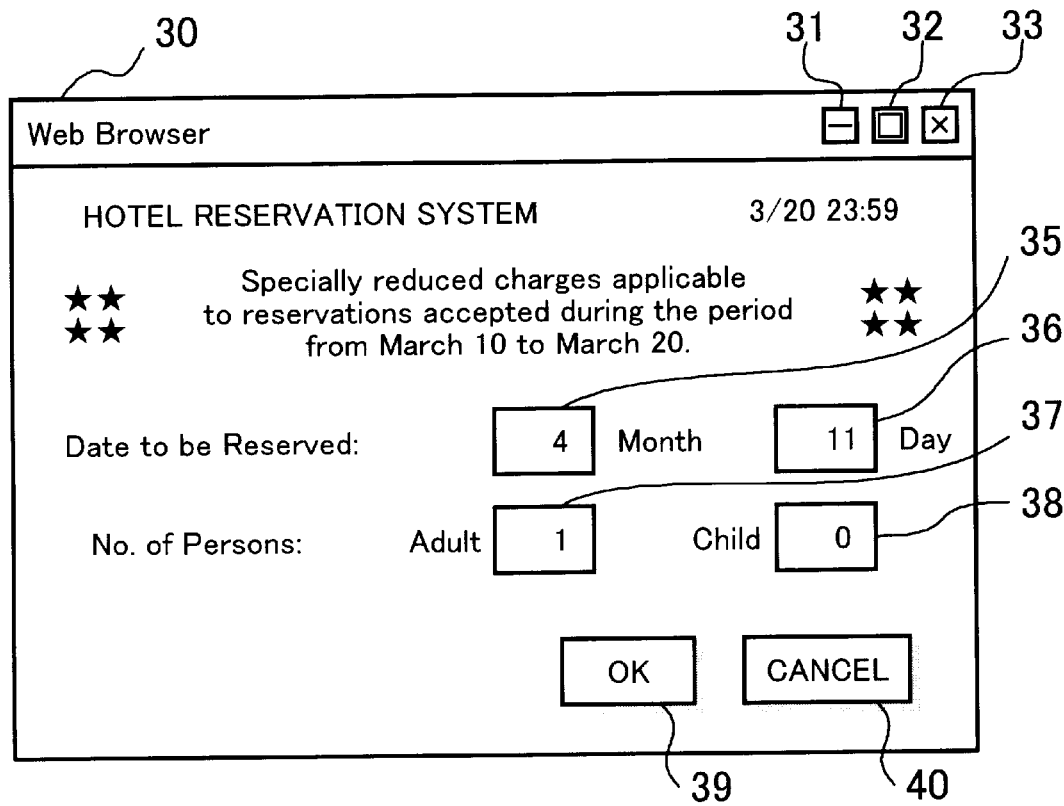
FIG. 7 is a diagram showing an example of entry of the necessary items on the screen shown in FIG. 6.

Let it be assumed that on the screen shown in FIG. 6, information has been entered as shown in FIG. 7. Specifically, "4" and "11" are entered in the "Month" and "Day" text boxes 35 and 36, respectively, to specify the date to be reserved, and "1" and "0" are entered in the "Adult" and "Child" text boxes 37 and 38, respectively, to specify the number of persons. With information entered in this manner, the OK button 39 is operated, whereupon the client 3 acquires the information input in the window 30, appends the session ID acquired from Cookie or the like to the URL, and transmits the information to the server 1.

Since the received URL has the session ID appended thereto, the server 1 judges that the received information concerns an ongoing session, and supplies the information to the definition information supply means 1e.

The definition information supply means 1e supplies the session ID to the definition information specifying means 1d and requests same to supply the corresponding definition information. The definition information specifying means 1d refers to the session management table (cf. FIG. 4) stored in the association information storing means 1c, to specify the edition number of the definition information corresponding to the session ID.

In this example, the session ID is "10", and therefore, the definition edition number "01" is acquired. The definition information specifying means 1d then looks up the edition number and specifies the corresponding definition information in the definition information storage section 1g. Subsequently, predetermined data (e.g., HTML document) included in the thus-specified definition information is read out from the definition information storage section 1g and supplied to the definition information supply means 1e.

The definition information supply means 1e transmits the definition information supplied thereto from the definition information specifying means 1d to the client 3 through the network 2.

Figure 8:
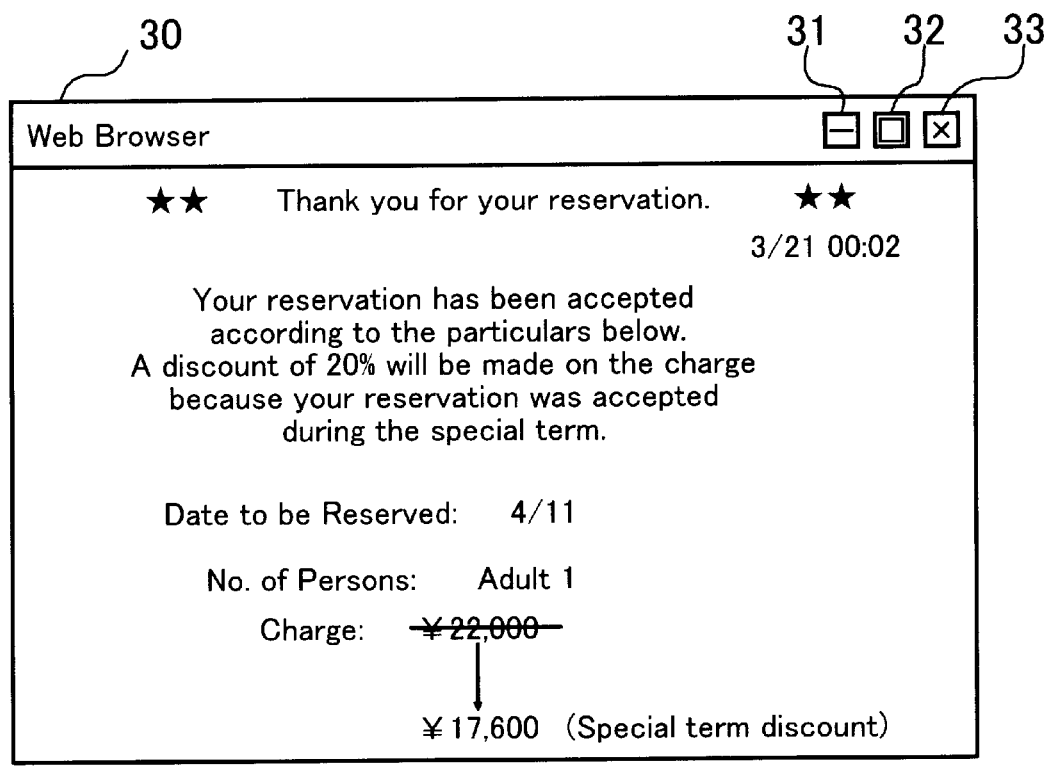
FIG. 8 is a diagram showing an example of a screen which is displayed next upon operation of an OK button on the input screen shown in FIG. 7.

This information is acquired by the client 3 and displayed at the display device by means of the browser. As a result, a screen as shown in FIG. 8 is displayed.

In the illustrated example, the message "★★Thank you for your reservation.★★" is displayed at the top of the display area of the window 30, and the current date and time "3/21 00:02" are displayed in a lower right part with respect to the message. Below the date and time are displayed a message stating that the reservation has been accepted, and a message stating that a discount of 20% will be made on the room charge because the reservation was accepted during the special term. Also, beneath the messages are displayed "4/11" as the date reserved, "Adult 1" as the number of persons, and a reduction of charge from "¥22,000" to "¥17,600" as the applicable charge.

Let it be assumed that another client (not shown) makes a similar reservation on March 21. Also in this case, a process similar to that of the aforementioned case is executed, but since the validity term of the definition information with the edition number 01 lasts until March 20 and the definition information with the edition number 02 thereafter takes effect, as seen from FIG. 3, screens shown in FIGS. 9 and 10 are displayed, respectively, as the screen for the entry of particulars of a reservation and the screen for confirmation of the particulars of the reservation.

Figure 9:
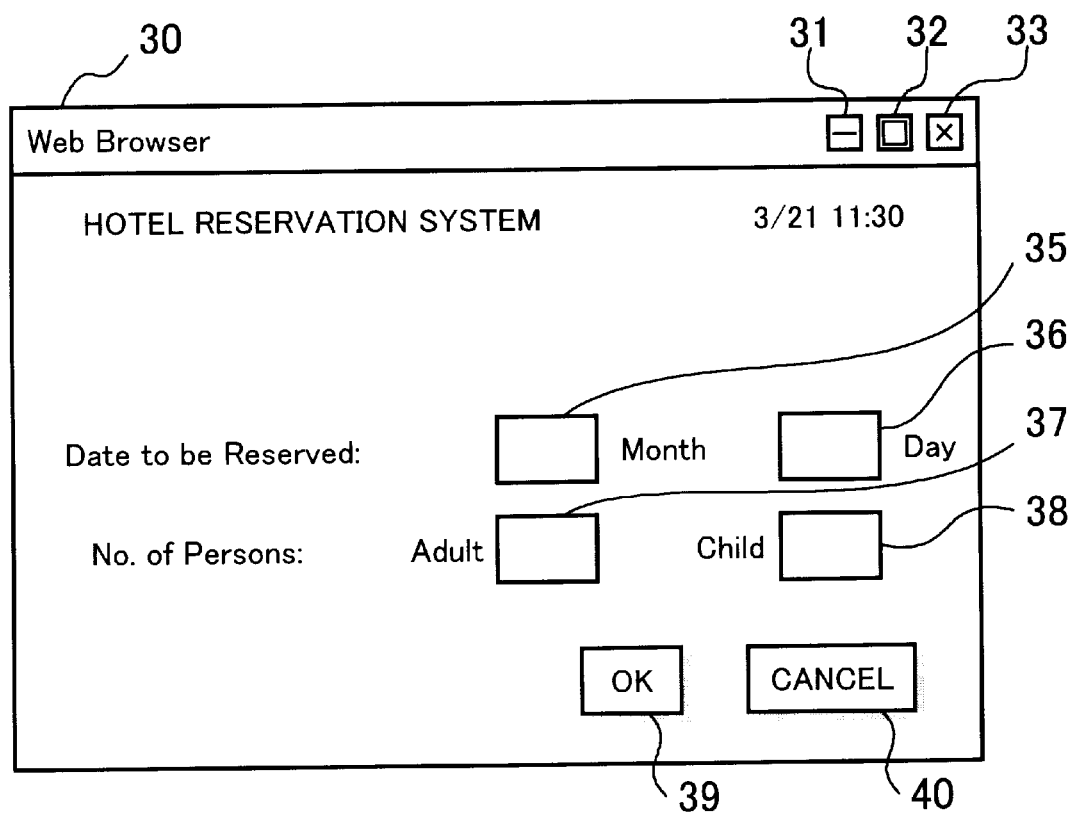
FIG. 9 is a diagram showing an example of a screen which is displayed first when a client accesses the server after the expiration of a special term.
Figure 10:
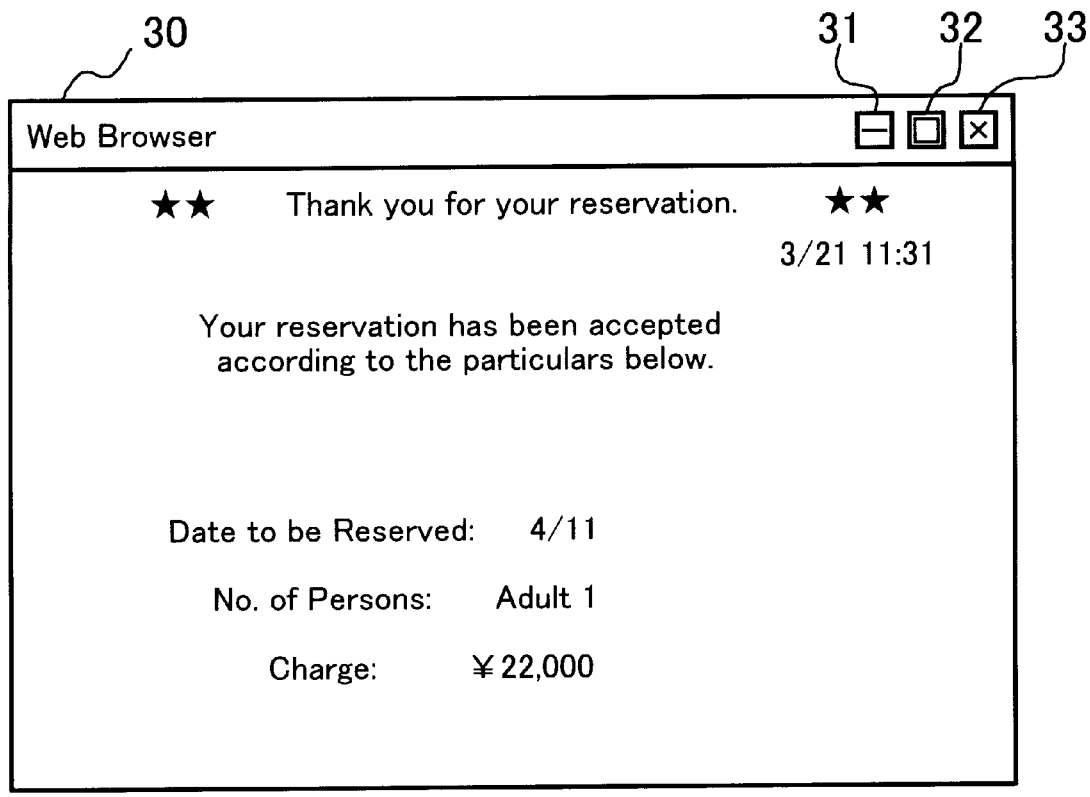
FIG. 10 is a diagram showing an example of a screen which is displayed next upon operation of the OK button after the necessary items are entered on the screen shown in FIG. 9.

The illustrated example of FIG. 9 differs from the screen shown in FIG. 6 in that the screen does not include the message offering the discount. The screen shown in FIG. 10 differs from that shown in FIG. 8 in that the screen does not include the message indicating the discount and the reduced charge.

By thus recording the definition information with its validity term associated therewith, the definition information can be automatically updated after the lapse of the validity term.

In the example shown in FIG. 7, the date and time at which the reservation was made are "3/20 23:59" immediately before the expiration of the special term. On the other hand, the screen confirming the particulars of the reservation is received on "3/21 00:02", which is immediately after the expiration of the special term, as shown in FIG. 8. However, in this embodiment, the edition numbers (edition numbers of definition information) are managed while looking up the date and time of initiation of each session, and the supply of identical definition information is ensured until the termination of each session. Thus, even in cases where access is initiated immediately before the update of definition information and is continued after the update, services can be provided normally.

Figure 11:
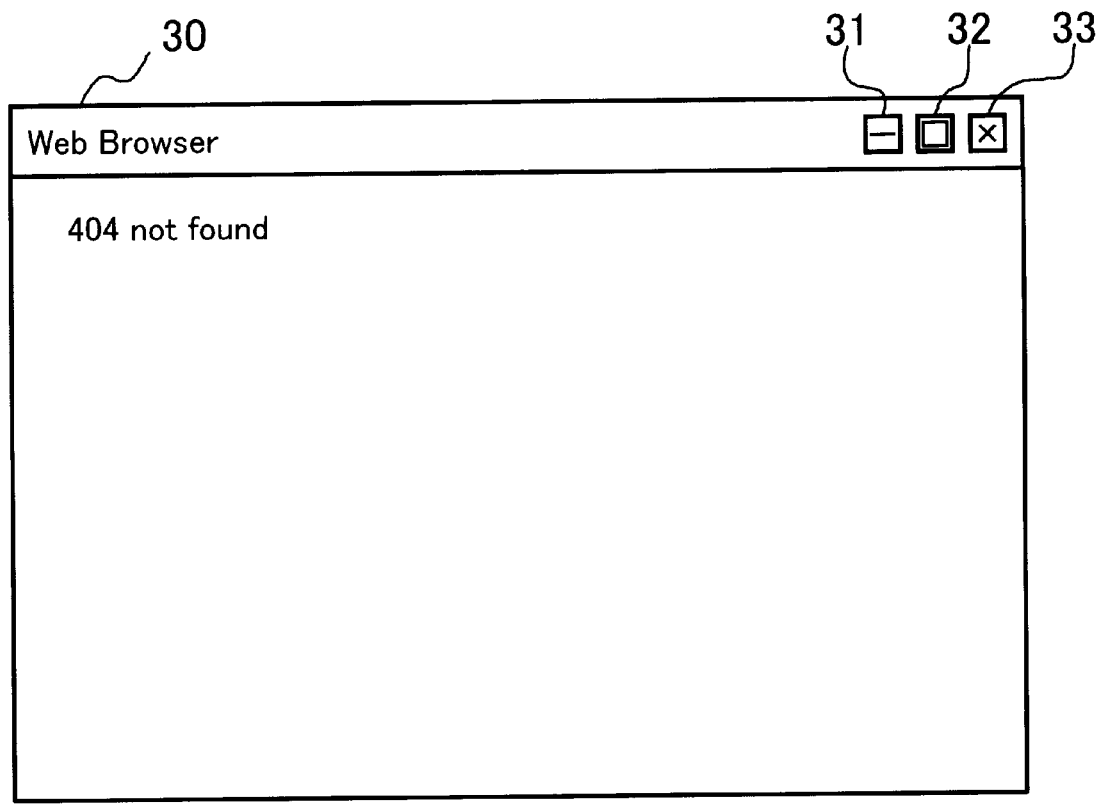
FIG. 11 is a diagram showing an example of a screen which is displayed in a conventional system when definition information has been modified during a session.

In conventional systems, after access from the client 3 is once restrained, the server 1 is stopped and the definition information is updated. In this case, therefore, there is a period of suspension during which the server 1 does not provide services. Also, if the definition information is updated without regard to access from clients, then after the modification, identity of the definition information is not ensured for a client that initiated access immediately before the update. In such cases, a screen as shown in FIG. 11, for example, is displayed at the display device of the client.

The operation of the embodiment will be now described with reference to the drawings.

Figure 12:
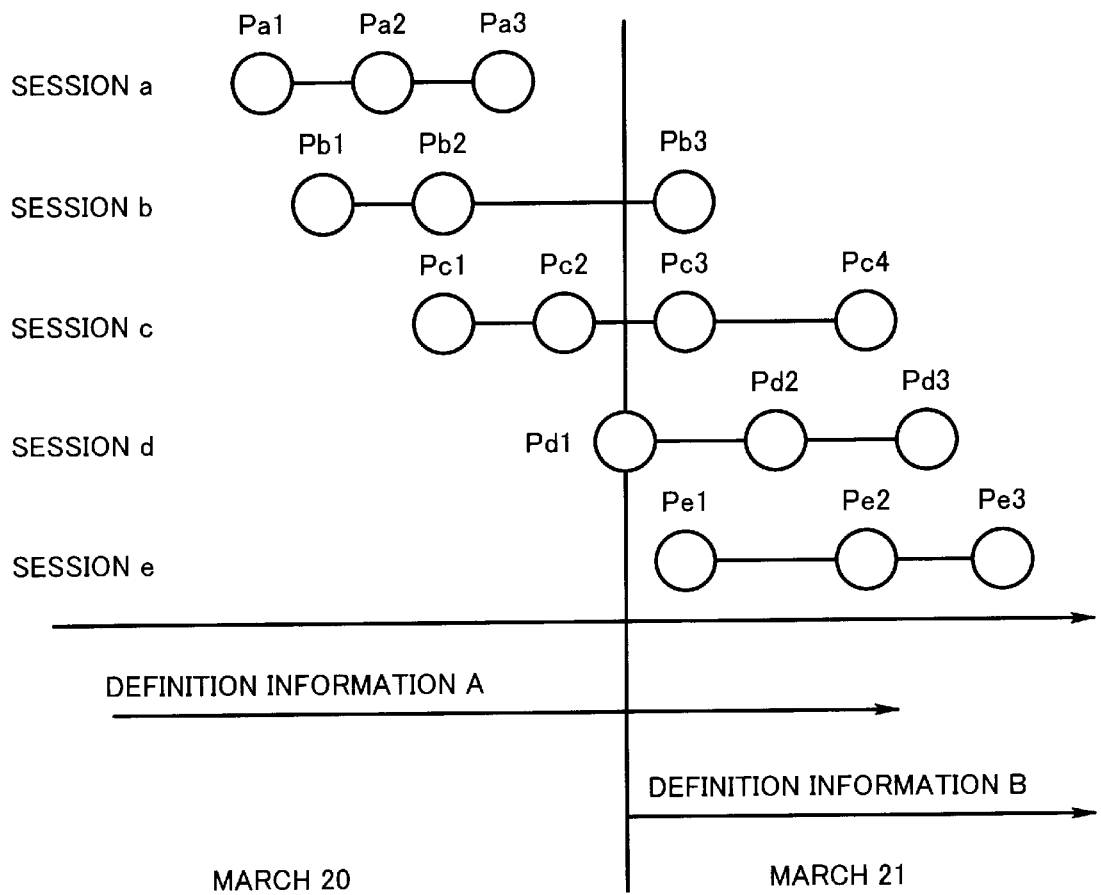
FIG. 12 is a diagram showing the relationship between the transition of sessions with time and definition information.

FIG. 12 shows the relationship between the transition of sessions with time and the definition information. In FIG. 12, "○" indicates that a request is made by the client with respect to the server at the illustrated point of time. Also, a series of circles "○" connected together by line segments constitutes one session. In the illustrated example, session a is initiated on March 20, which is within the special term, and is terminated during the term. Sessions b and c are initiated just before the expiration of the special term and terminated after the term expires. Sessions d and e are initiated immediately after the expiration of the term.

Among these sessions, the sessions b and c can encounter a problem when the definition information is updated.

Figure 13:
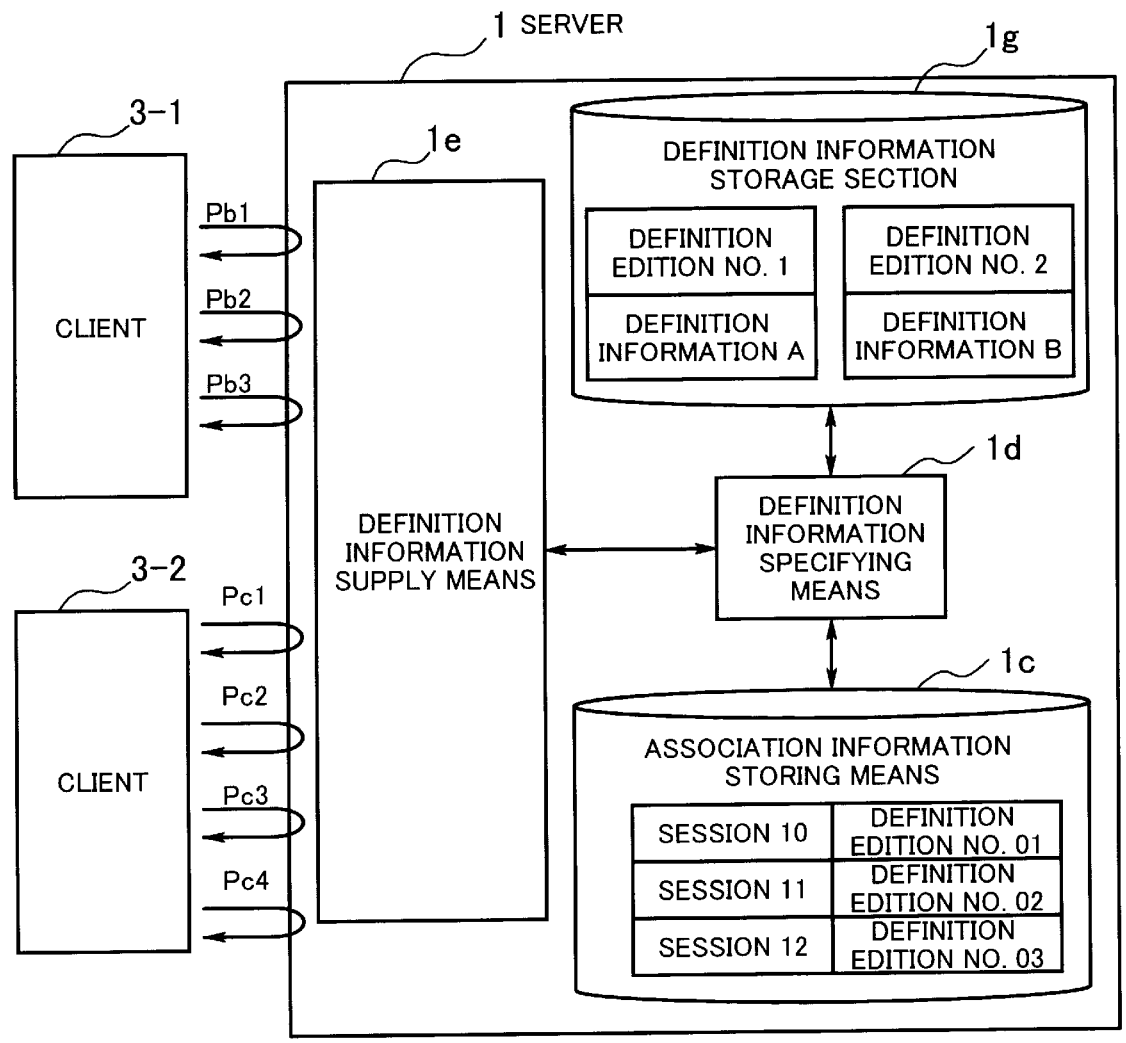
FIG. 13 is a diagram showing the relationship between the server and clients with which sessions b and c, among those shown in FIG. 12, are concerned.

FIG. 13 shows the relationship between the server 1 and clients 3-1 and 3-2 with which the sessions b and c are concerned. FIG. 13 shows only part of the elements constituting the server 1 for simplicity of explanation.

As shown in FIG. 13, when requests Pb1 to Pb3 and Pc1 to Pc4 are transmitted from the clients 3-1 and 3-2, respectively, to the server 1, the definition information supply means 1e acquires the session ID included in each request (in the case of the first requests Pb1 and Pc1, however, it acquires the session ID generated by the session specification information generating means 1a), and supplies the session ID to the definition information specifying means 1d.

The definition information specifying means 1d looks up the association information stored in the association information storing means 1c and acquires the edition number of the corresponding definition information. Subsequently, the definition information specifying means 1d acquires predetermined data included in the definition information with the corresponding edition number from the definition information storage section 1g, and supplies the acquired data to the definition information supply means 1e. The definition information supply means 1e transmits the data supplied thereto to the clients 3-1 and 3-2.

Figure 14:
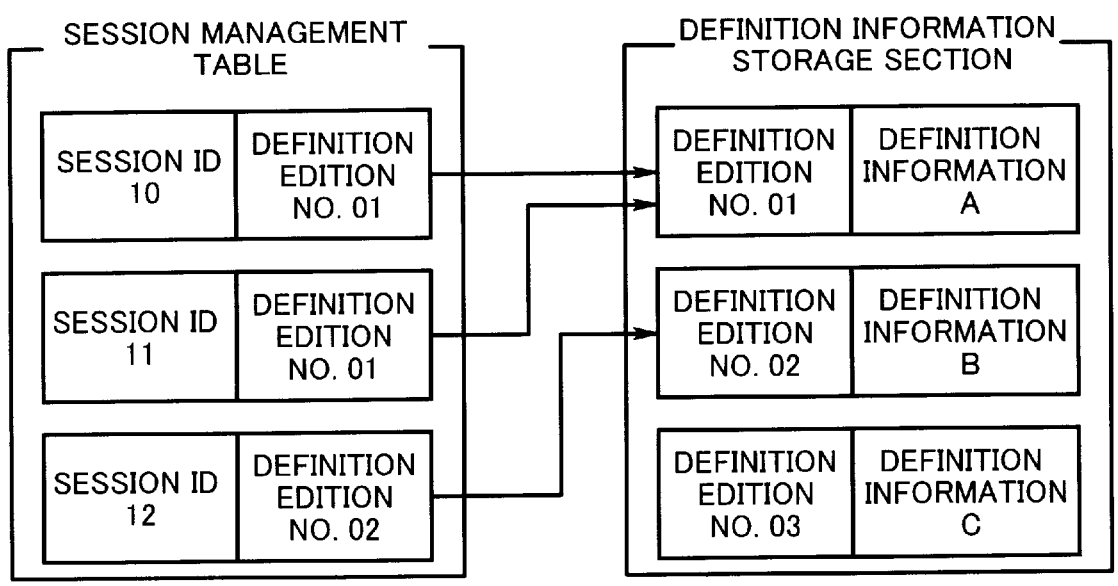
FIG. 14 is a diagram showing the correspondence of association information stored in the session management table to definition information stored in the definition information storage section.

FIG. 14 shows the correspondence of the association information stored in the session management table to the definition information stored in the definition information storage section 1g. As shown in FIG. 14, the session with the session ID "10" and the session with the session ID "11" are associated with the definition information A with the edition number "01", and the session with the session ID "12" is associated with the definition information B with the edition number "02". Such association is performed by making reference to the date and time of initiation of the session and to the validity term management table (cf. FIG. 3), as mentioned above. The definition information supply means 1e transmits the definition information supplied thereto to the client that has made the request.

Thus, the request from an identical client is recognized as part of an identical session, and the supply of identical definition information is ensured until the session is terminated, whereby inconveniences can be prevented from being caused when the definition information is modified.

Figure 15:
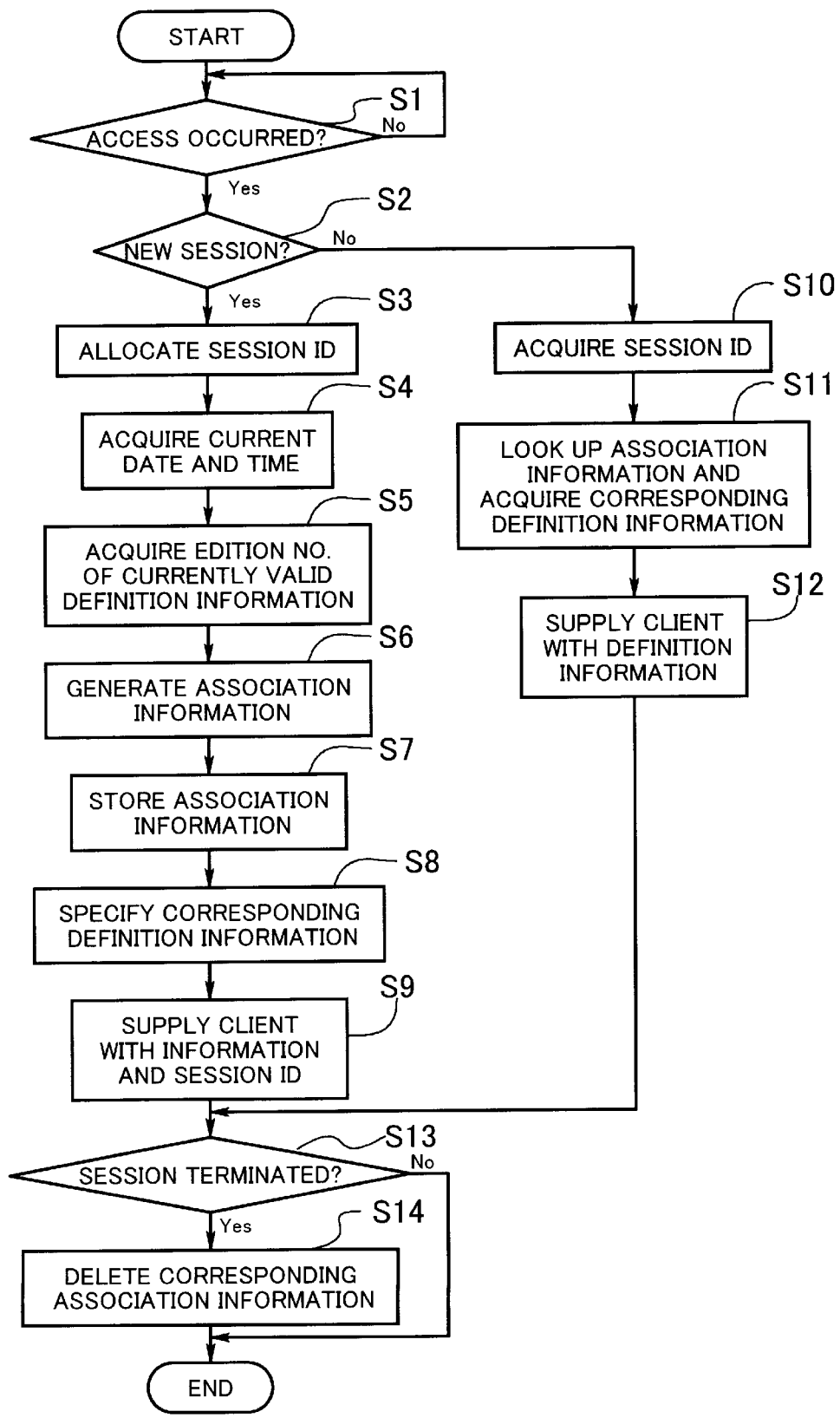
FIG. 15 is a flowchart exemplifying a process for performing the function of the server according to the embodiment shown in FIG. 1.
Figure 16:
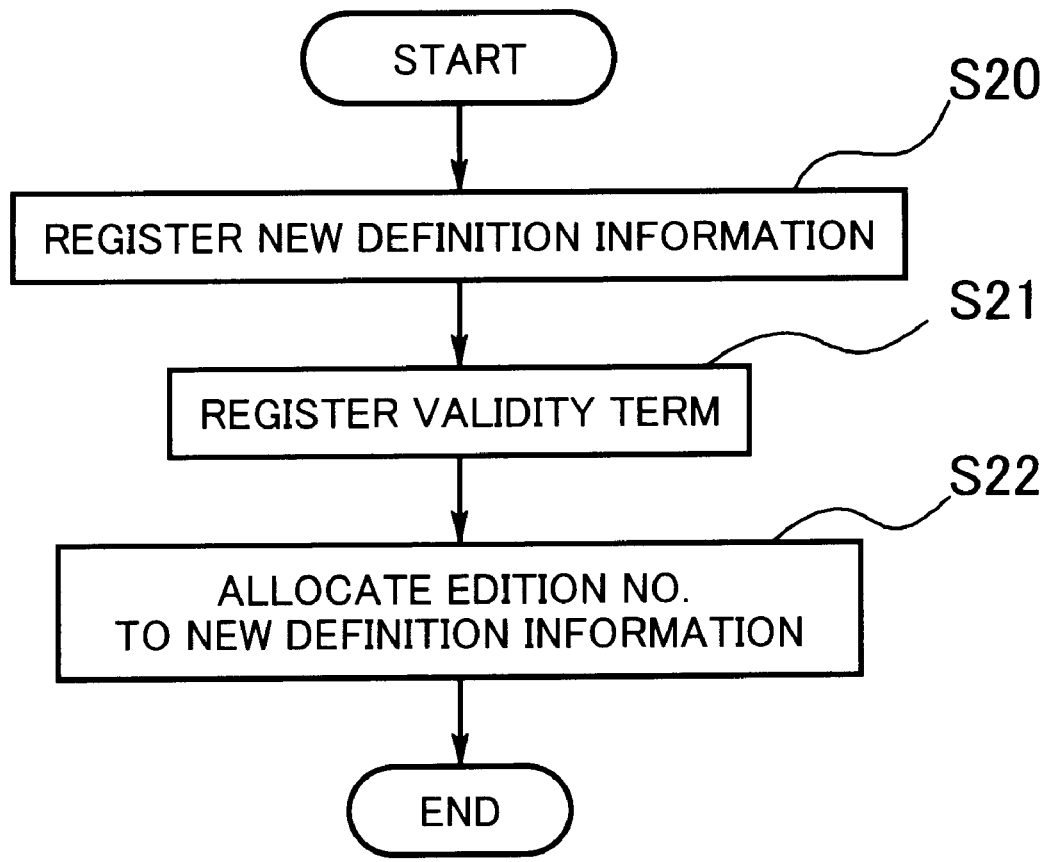
FIG. 16 is a flowchart exemplifying a process executed when new definition information is registered with respect to the server according to the embodiment shown in FIG. 1.

Referring finally to FIGS. 15 and 16, a process for performing the function of the server 1 shown in FIG. 1 will be described.

FIG. 15 is a flowchart exemplifying the process for performing the function of the server 1. Upon start of the process shown in the flowchart, the following steps are executed.

[S1] The server 1 determines whether or not access from the client 3 has occurred. If access has occurred, the flow proceeds to Step S2; otherwise the flow returns and Step S1 is repeatedly executed.

[S2] The server 1 determines whether or not the access from the client 3 is a new session. If the access is a new session, the flow proceeds to Step S3, and if not, the flow proceeds to Step S10.

The determination as to whether or not the access is a new session is made by determining whether or not a session ID is appended to the URL transmitted from the client 3.

[S3] The session specification information generating means 1a generates a session ID for the new session and supplies same to the association information generating means 1b.

[S4] The association information generating means 1b acquires current date and time from the timer 1h.

[S5] The association information generating means 1b looks up the date and time acquired in Step S4, to specify the edition number of definition information within the validity term of which the current date and time fall.

To specify the edition number, the validity term management table shown in FIG. 3 is referred to.

[S6] The association information generating means 1b generates association information that associates the session with the edition number of the definition information, and supplies the generated information to the association information storing means 1c.

[S7] The association information storing means 1c stores the association information supplied from the association information generating means 1b in the session management table shown in FIG. 4.

[S8] The definition information specifying means 1d makes reference to the session management table newly stored in the association information storing means 1c and specifies, from among the information in the definition information storage section 1g, the definition information corresponding to the newly generated session ID.

[S9] The definition information supply means 1e supplies the client 3 with the newly generated session ID and predetermined data included in the specified definition information.

[S10] The definition information supply means 1e acquires the session ID from the URL.

[S11] The definition information specifying means 1d refers to the session management table and specifies, from among the information in the definition information storage section 1g, the definition information corresponding to the session ID supplied from the definition information supply means 1e.

[S12] The definition information supply means 1e supplies predetermined data included in the specified definition information to the client 3 that has made the request.

[S13] The association information deleting means 1f determines whether or not the session has been terminated. If the session has been terminated, the flow proceeds to Step S14; otherwise the process is ended.

[S14] The association information deleting means 1f deletes the corresponding association information from the session management table, followed by termination of the process.

Referring now to FIG. 16, a process executed when new definition information is registered with respect to the server 1 will be described. Upon start of the process shown in the flowchart, the following steps are executed.

[S20] The server 1 registers new definition information in a predetermined area of the definition information storage section 1g.

[S21] The server 1 is supplied with a validity term of the newly registered definition information from an input device, not shown, and registers the validity term in the validity term management table (cf. FIG. 3) of the association information storing means 1c.

[S22] The server 1 generates a definition edition number and allocates same to the new definition information.

Namely, the definition information stored in the definition information storage section 1g is allocated the definition edition number. When the allocation of the edition number to the definition information is completed, the process is ended.

The process described above makes it possible to perform the function explained with reference to FIG. 1.

In the above embodiment, the definition information is stored in the definition information storage section 1g provided inside the server 1. Alternatively, the definition information may be stored in an external storage device or other server so as to be read out as needed.

Also, in the embodiment, the session management table showing the correspondence of each session ID to definition information is prepared and is referred to in order to specify applicable definition information, but the present invention is not limited to such arrangement alone. The requirements are met if only each session and its corresponding definition information can be associated with each other.

Further, in the embodiment, the validity term management table showing the correspondence of definition information to its validity term is prepared and is referred to in order to associate each session with definition information, but the present invention is not limited to such arrangement alone. The requirements are met if only each new session can be uniquely associated with definition information when it has occurred.

Although, in the above embodiment, HTML document is taken as an example of the definition information, the information to be handled in the present invention is not limited to such document alone. For example, in cases where information to be transmitted to clients is stored in an external device, the specification information may be information which indicates the device and a storage location thereof. Also, the definition information may be not only data but various application programs such as CGI (Common Gateway Interface) etc.

Also, in the foregoing embodiment, the date and time at which a session is initiated are compared with the validity term of each definition information to specify applicable definition information, but the latest definition information at the time of initiation of a session, for example, may be used as the applicable definition information.

The processing function described above can be performed by a computer. In this case, the contents of the process for performing the function as a server may be described in a program recorded on a computer-readable recording medium. The program is executed by the computer, whereupon the above-described process is performed by the computer. The computer-readable recording medium includes a magnetic storage device, a semiconductor memory, etc.

To bring the program to market, the program may be stored in portable recording media, such as CD-ROM (Compact Disk Read Only Memory) or floppy disk, to be distributed, or the program may be stored in a storage device of a computer connected to a network so that it can be transferred to other computers through the network. The program may be stored in a hard disk unit or the like of a computer, and when it is to be executed by the computer, the program is loaded into the main memory and executed.

As described above, according to the present invention, a server capable of accepting a session which is a series of requests issued from a client comprises session specification information generating means, responsive to initiation of a session of the client, for generating session specification information which is information specifying the session, association information generating means for generating association information indicative of association of the session specification information with corresponding definition information, association information storing means for storing the association information, definition information specifying means, responsive to access from the client, for looking up the association information to acquire the definition information corresponding to the session specification information which the client possesses, and definition information supply means for supplying the definition information acquired by the definition information specifying means or information related to the definition information to the client that has made the access, whereby the server can be operated uninterruptedly.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A server capable of accepting a session which is a series of requests issued from a client, comprising:

session specification information generating means, responsive to initiation of a session of the client, for generating session specification information which is information specifying the session;

association information generating means for generating association information indicative of association of the session specification information with corresponding definition information;

association information storing means for storing the association information;

definition information specifying means, responsive to access from the client, for looking up the association information to specify the definition information corresponding to the session specification information which the client possesses; and definition information supply means for supplying the definition information specified by said definition information specifying means or information related to the definition information to the client that has made the access.

2. The server according to claim 1, wherein said association information generating means selects definition information in accordance with a date and time at which the session is initiated, to generate the association information.

3. The server according to claim 2, wherein the definition information includes information indicative of a validity term, and said association information generating means looks up the validity term and the date and time at which the session is initiated, to generate the association information.

4. The server according to claim 1, further comprising association information deleting means, responsive to termination of the session, for deleting the corresponding association information from said association information storing means.

5. A computer-readable recording medium recording a program to be executed by a computer for causing the computer to perform a process as a server capable of accepting a session which is a series of requests issued from a client, wherein the program causes the computer to function as:

session specification information generating means, responsive to initiation of a session of the client, for generating session specification information which is information specifying the session;

association information generating means for generating association information indicative of association of the session specification information with corresponding definition information;

association information storing means for storing the association information;

definition information specifying means, responsive to access from the client, for looking up the association information to specify the definition information corresponding to the session specification information which the client possesses; and definition information supply means for supplying the definition information specified by said definition information specifying means or information related to the definition information to the client that has made the access.

* * * * *